(12) United States Patent
Montgomery

(10) Patent No.: US 6,379,112 B1
(45) Date of Patent: Apr. 30, 2002

(54) QUADRANT ROTOR MISTUNING FOR DECREASING VIBRATION

(75) Inventor: Matthew Montgomery, Jupiter, FL (US)

(73) Assignee: United Technologies Corporation, Hartford, CT (US)

(*) Notice: Subject to any disclaimer, the term of this patent is extended or adjusted under 35 U.S.C. 154(b) by 0 days.

(21) Appl. No.: 09/706,412

(22) Filed: Nov. 4, 2000

(51) Int. Cl.[7] .................................................. F01D 5/10
(52) U.S. Cl. ...................... 415/119; 416/144; 416/203; 416/500
(58) Field of Search ........................... 415/119; 416/144, 416/175, 203, 500, 145

(56) References Cited

U.S. PATENT DOCUMENTS

| | | | | |
|---|---|---|---|---|
| 1,983,606 A | * | 12/1934 | Geise | 123/1.49 |
| 2,098,640 A | * | 11/1937 | Cary | 415/119 |
| 4,878,810 A | * | 11/1989 | Evans | 416/175 |
| 5,681,145 A | * | 10/1997 | Neely et al. | 415/119 |
| 5,988,982 A | * | 11/1999 | Clauer | 219/121.62 |
| 5,993,161 A | * | 11/1999 | Shapiro | 29/404 |
| 6,042,338 A | * | 3/2000 | Brafford et al. | 29/889 |

* cited by examiner

*Primary Examiner*—Edward K. Look
*Assistant Examiner*—Richard Edgar
(74) *Attorney, Agent, or Firm*—Bachman & LaPointe, P.C.

(57) ABSTRACT

The present invention relates to an array of flow directing elements for use in turbomachinery. The array comprises a plurality of flow directing elements arranged around a disk in a circular pattern having four quadrants. The flow directing elements in each quadrant are different in mass from the flow directing elements in each adjacent quadrant to reduce the tendency of the array to exhibit tuned absorbed behavior. Further, the number of flow directing elements in each quadrant are different from the number of flow directing elements in each adjacent quadrant to reduce stator vibration in the turbomachinery. Still further, centfrigual pull on the disk is equalized by assembling quadrants with lower flow directing element count from heavier flow directing elements.

9 Claims, 2 Drawing Sheets

QUADRANT ROTOR MISTUNING FOR DECREASING VIBRATION

BACKGROUND OF THE INVENTION

The present invention relates to a structurally mistuned array of flow directing elements, such as a row of rotor blades, to be used in turbomachinery for reducing the vibration which occurs in stator vanes used in the turbomachinery and for reducing the susceptibility of the flow directing element assembly to the tuned absorbed phenomenon.

Turbomachinery blades and vanes arranged in alternating rows are subject to destructive vibrations due to the aerodynamic action with other blade rows which rotate relative thereto. Still further, the rotor blades in a row can vibrate when spun through flow distortions caused by stator vanes in an adjacent or nearby row. Additionally, the rotating flow distortions due to the rotor blades cause stator vanes in an adjacent or nearby row to vibrate.

Changing the count of stator vanes in 180 degree segments, e.g. 40 stator vanes in a top segment and 42 stator vanes in a bottom segment, reduces the vibration of adjacent rotor blades. This is because the different circumferential spacings of the stator vanes cause the rotor blades to vibrate at two different frequencies during each rotor revolution. In a similar manner, changing rotor blade count will reduce stator vibration.

Vibrating rotor blades are susceptible to a detrimental phenomenon known as "tuned absorbed" or "mode localization". This phenomenon causes the vibration energy of an entire rotor assembly to become concentrated in just a few of the blades or flow directing elements in the rotor, leading to high vibration and premature failure of these blades or flow directing elements. One factor that contributes to this phenomenon is the structural coupling, through the rotor disk, between blades with similar natural frequencies.

SUMMARY OF THE INVENTION

Accordingly, it is an object of the present invention to provide an improved flow directing element array for use in turbomachinery.

It is a further object of the present invention to provide an improved flow directing element array as above which reduces the vibration of stator vanes in the turbomachinery.

It is yet a further object of the present invention to provide an improved flow directing element array as above which reduces the susceptibility of a rotor to the tuned absorbed phenomenon.

The foregoing objects are attained by the flow directing element array of the present invention.

In accordance with the present invention, an array of flow directing elements known as a blade row for use in turbomachinery is provided. The array broadly comprises a plurality of flow directing elements mounted to a disk and extending about the disk in a circular pattern having four quadrants. Each flow directing element in a first one and a second one of the quadrants preferably has a greater mass than each flow directing element in a third one and a fourth one of the quadrants with each of the first and second quadrants being located intermediate the third and fourth quadrants. The flow directing elements are further arranged so that the number of flow directing elements in each of the first and second quadrants is less than the number of flow directing elements in each of the third and fourth quadrants.

As used herein, the word turbomachinery refers to devices, such as gas turbine engines and steam turbines, which operate by exchanging energy with a working fluid using alternating rows of rotating blades and non-rotating vanes or stators.

Other details of the flow directing element array of the present invention, as well as other objects and advantages attendant thereto, are set forth in the following detailed description and the accompanying drawing(s) wherein like reference numerals depict like elements.

DETAILED DESCRIPTION OF THE PREFERRED EMBODIMENT(S)

Figure 1:
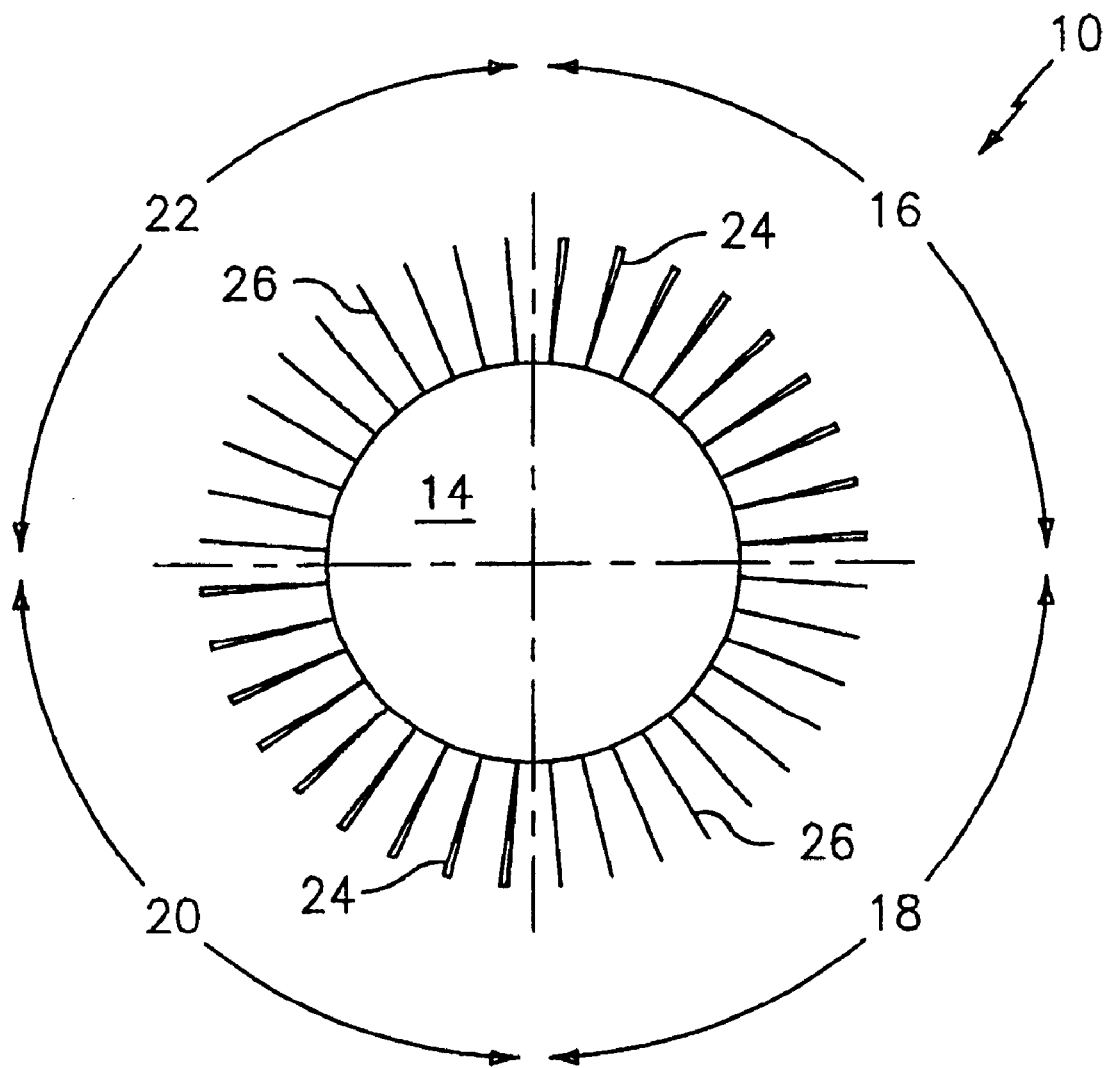
FIG. 1 illustrates a flow directing element array in accordance with the present invention.

Referring now to the drawings, FIG. 1 illustrates an array 10 of flow directing elements, such as a rotor assembly, in accordance with the present invention. The array 10 may be used in turbomachinery devices such as a gas turbine engine and a steam turbine. As previously mentioned, the array 10 is structurally mistuned to reduce the vibrations which occur in stator vanes in the turbomachinery devices and to reduce the susceptibility of the array, such as a rotor assembly, to the tuned absorbed phenomenon.

The mistuned array 10 in accordance with the present invention has a plurality of fluid directing elements or rotor blades 24 and 26 arranged in a row. The flow directing elements 24 and 26 extend about a disk 14 in a circular pattern having four quadrants 16, 18, 20, and 22. The flow directing elements 24 and 26 may be mounted or attached to the disk 14 in any suitable manner known in the art.

In the mistuned array 10 of the present invention, two types of flow directing element quadrants are alternated. The number of flow directing elements or blades 24 and 26 and the mass of the individual flow directing elements or blades 24 and 26 differ between the two types of rotor blade quadrants. Quadrants 16 and 20 preferably are each of the first type of quadrant, while quadrants 18 and 22 preferably are each of the second type of quadrant.

The first type of quadrant contains N heavier flow directing elements or blades 24, while the second quadrant type contains N+1 lighter flow directing elements or blades 26 where N is an integer. FIG. 1 for example shows an array where N=9. It has been found that changing the flow directing element or blade count between adjacent quadrants tends to reduce stator vane vibration in the turbomachinery.

The flow directing elements or blades 24 in the first quadrant type are greater in mass than the flow directing elements or blades 26 in the second quadrant type. In a preferred embodiment of the present invention, the ratio of the mass of each flow directing element 24 to the mass of each flow directing element 26 is approximately (N+1):N. Changing the mass of the flow directing elements between adjacent quadrants has two beneficial effects. The first effect is changing the vibration frequency of the flow directing elements in each quadrant, thus opposing tuned absorber phenomenon by reducing the structural coupling of vibration between quadrants. The second effect is equalizing the centrifugal pull on the disk 14 by offsetting the lower flow directing element count of the first quadrant type with a heavier flow directing element 24.

Figure 2:
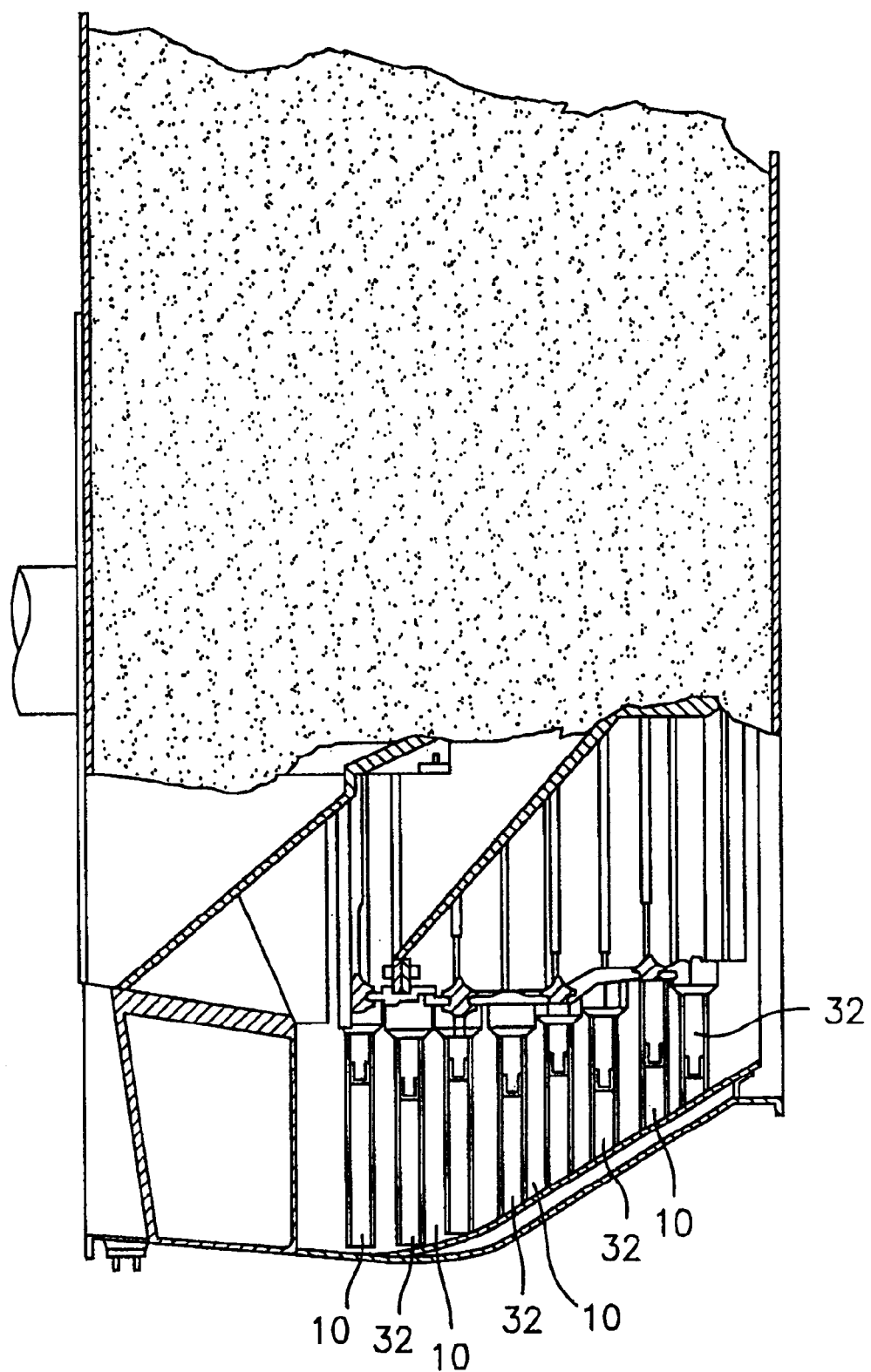
FIG. 2 illustrates a cross sectional side view of a turbine module for a commercial aircraft gas turbine engine which includes a flow directing element array in accordance with the present invention.

Referring now to FIG. 2, a turbine module for a commercial aircraft gas turbine engine is shown. The turbine module includes a plurality of rotor assemblies or rotor stages 40, one or more of which may comprise a flow directing element array in accordance with the present invention. The turbine module also includes one or more stages of circumferentially distributed stator vanes 32 axially offset from the flow directing elements 24 and 26.

It is apparent that there has been provided in accordance with the present invention a quadrant rotor mistuned for decreasing vibration which fully satisfies the objects, means, and advantages set forth hereinabove. While the present invention has been described in the context of specific embodiments thereof, other alternatives, modifications, and variations will become apparent to those skilled in the art having read the foregoing description. Therefore, it is intended to embrace those alternatives, modifications, and variations which fall within the broad scope of the appended claims.

What is claimed is:

1. An array of flow directing elements for use in turbomachinery comprising:

a disk and a plurality of flow directing elements attached to and extending from said disk;

said plurality of flow directing elements being arranged in a circular pattern having four quadrants; and said flow directing elements in a first one and a second one of said quadrants each having a mass greater than said flow directing elements in a third one and a fourth one of said quadrants.

2. An array according to claim 1, wherein said first one of said quadrants is positioned between said third one and said fourth one of said quadrants and said second one of said quadrants is also positioned between said third one and said fourth one of said quadrants.

3. An array according to claim 1, wherein each of said first and second quadrants contains a number of flow directing elements different from the number of flow directing elements in said third and fourth quadrants.

4. An array according to claim 3, wherein said first and second quadrants each contain N flow directing elements and wherein said third and fourth quadrants each contain N+1 flow directing elements where N is an integer.

5. An array according to claim 3, wherein the ratio of the mass of each individual blade in said first and second quadrants to the mass of each individual blade in said third and fourth quadrants is approximately (N+1):N.

6. An array according to claim 1, where said flow directing elements comprise a plurality of rotor blades aligned in a row.

7. An array of flow directing elements for use in turbomachinery which comprises:

a plurality of flow directing elements arranged in a circular pattern having four quadrants; and said flow directing elements in one quadrant having a different count that said flow directing elements in each adjacent quadrant for reducing vibration in adjacent stator rows in said turbomachinery.

8. An array of flow directing elements for use in turbomachinery which comprises:

a plurality of flow directing elements arranged in a circular pattern having four quadrants; and said flow directing elements in one quadrant each having a mass different from the mass of each flow directing element positioned in two adjacent quadrants to reduce the tendency of the array to exhibit tuned absorbed behavior.

9. An array of flow directing elements for use in turbomachinery which comprises:

a plurality of flow directing elements mounted to a disk;

said flow directing elements being arranged in a circular pattern having four quadrants; and said flow directing elements in two diametrically opposed quadrants having a lower element count and a greater mass than said flow directing elements in the remaining quadrants so as to equalize centrifugal pull on said disk.

* * * * *